United States Patent
Azam et al.

(10) Patent No.: US 12,099,515 B1
(45) Date of Patent: Sep. 24, 2024

(54) CONVERTING NON TIME SERIES DATA TO TIME SERIES DATA

(71) Applicant: Amazon Technologies, Inc., Seattle, WA (US)

(72) Inventors: Mohammed Talal Yassar Azam, Snoqualmie, WA (US); Mohammad Adnan, Kent, WA (US); Ahmed Gamal Hamed, Mill Creek, WA (US); Fnu Syed Furqhan Ulla, Redmond, WA (US); Shekhar Agrawal, Bellevue, WA (US); Ketan Vijayvargiya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 17/488,771

(22) Filed: Sep. 29, 2021

(51) Int. Cl.
G06F 16/25 (2019.01)
G06F 16/2458 (2019.01)

(52) U.S. Cl.
CPC ........ *G06F 16/258* (2019.01); *G06F 16/2477* (2019.01)

(58) Field of Classification Search
CPC ........... G06F 11/3476; G06F 2201/835; G06F 2201/86; G06F 2201/87; G06F 16/258; G06F 16/2477
See application file for complete search history.

(56) References Cited

U.S. PATENT DOCUMENTS

| 10,581,886 | B1* | 3/2020 | Sharifi Mehr | ...... H04L 63/1441 |
| 11,037,173 | B1 | 6/2021 | Gurnov et al. | |
| 2009/0234899 | A1 | 9/2009 | Kramer | |
| 2014/0241151 | A1* | 8/2014 | Ossipov | .................. H04L 47/12 370/230 |
| 2014/0379630 | A1 | 12/2014 | Horvitz et al. | |
| 2015/0033305 | A1* | 1/2015 | Shear | .................. G06F 21/6218 726/11 |
| 2016/0065611 | A1* | 3/2016 | Fakeri-Tabrizi | .... H04L 63/1441 726/23 |
| 2016/0092484 | A1* | 3/2016 | Finkler | ................. G06F 16/258 707/715 |
| 2017/0220672 | A1* | 8/2017 | Sainani | ................... G06F 17/18 |

(Continued)

OTHER PUBLICATIONS

Apte et al., Detection of causally anomalous time-series, International Journal of Data Science and Analytics (2021) 11:141-153 (Year: 2021).*

*Primary Examiner* — Cheyne D Ly

(74) *Attorney, Agent, or Firm* — Davis Wright Tremaine LLP

(57) ABSTRACT

Systems and methods are described for to detecting anomalies in various forms of data, including non-time series data. In one example, a data ingestion interval for customer data may be determined, where the data ingestion interval specifies a frequency at which data is analyzed to detect analogies in portions of the data corresponding to time windows. A portion of the customer data may then be obtained and aggregated from a data source according to the data ingestion interval. The portion of data may be converted into time series data by appending a time stamp corresponding to the time window of the portion of the data. The anomaly detection service may then process the time series data, using a time series data anomaly model, to detect one or more anomalies in the time series data.

18 Claims, 7 Drawing Sheets

(56) References Cited

U.S. PATENT DOCUMENTS

| | | |
|---|---|---|
| 2018/0260560 A1 | 9/2018 | Gross et al. |
| 2019/0238574 A1* | 8/2019 | Iliofotou ............. H04L 63/1433 |
| 2019/0251095 A1* | 8/2019 | Chauhan ............... G06F 16/901 |
| 2020/0160230 A1 | 5/2020 | Wang et al. |
| 2020/0210393 A1 | 7/2020 | Beaver et al. |
| 2021/0006479 A1* | 1/2021 | Sugashima ........... H04L 43/106 |
| 2021/0042382 A1 | 2/2021 | Freeman et al. |
| 2022/0026594 A1* | 1/2022 | Mohanty ................ G01V 11/00 |
| 2022/0334574 A1* | 10/2022 | Basak .................. G05B 23/024 |
| 2022/0342860 A1* | 10/2022 | Gonzalez Macias ........................ G06F 16/215 |

* cited by examiner

CONVERTING NON TIME SERIES DATA TO TIME SERIES DATA

BACKGROUND

Anomaly detection is becoming increasingly more important to analyze large amounts of data, such as are generated by cloud computing systems, customer applications, and so on. Existing anomaly detection systems typically use time-based patterns to identify anomalies across a number of metrics, such as revenue, click rate, and others. These systems however, are not designed to or capable of detecting anomalies in data that is not associated with time or non-time series data. Accordingly, techniques are needed for detecting anomalies in non-time series data.

BRIEF DESCRIPTION OF THE DRAWINGS

Various techniques will be described with reference to the drawings, in which.

DETAILED DESCRIPTION

Figure 1:
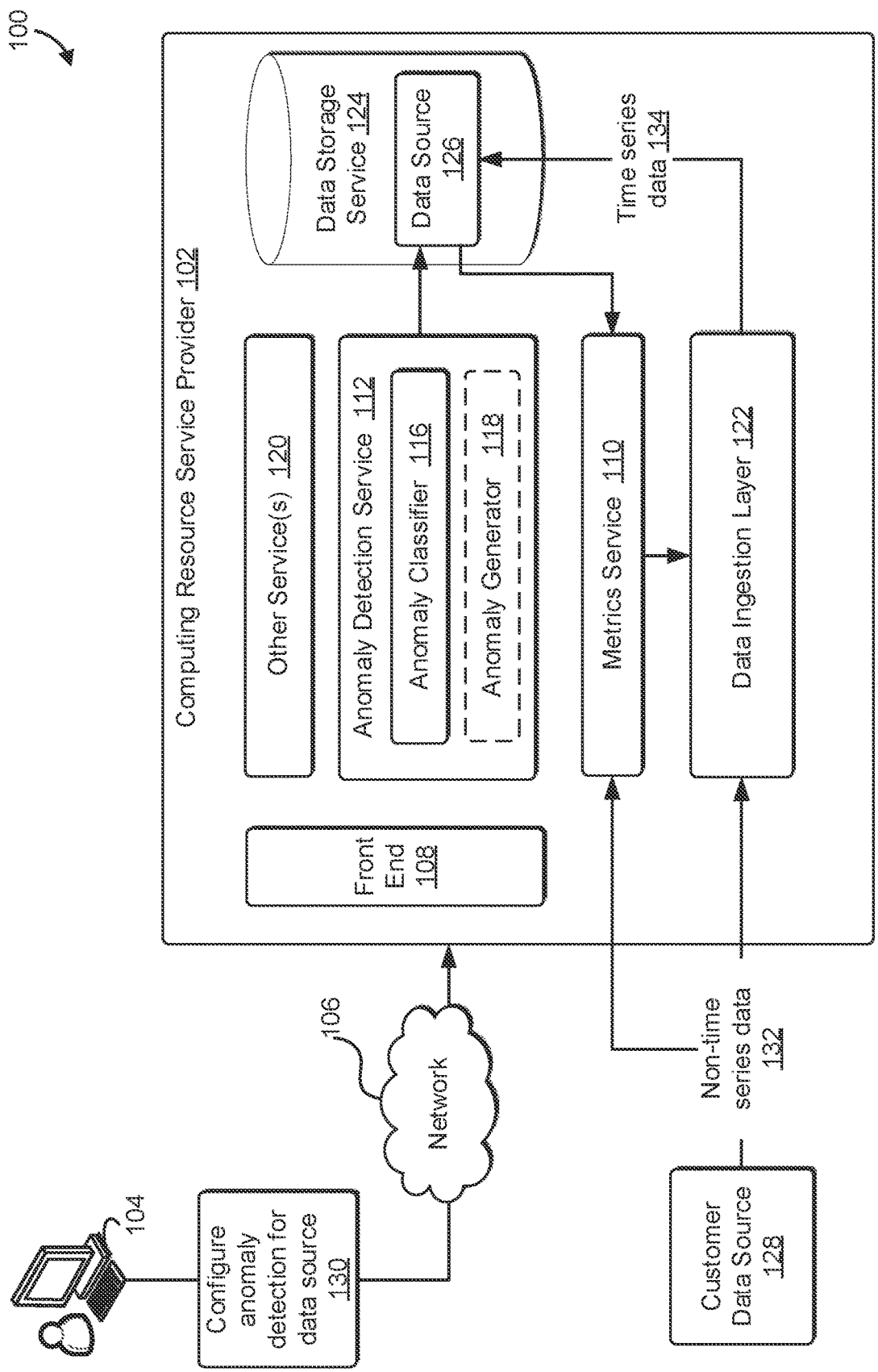
FIG. 1 illustrates an example environment in which the described techniques can be practiced, according to at least one embodiment.

Various systems and methods are described herein relating to detecting anomalies in various forms of data, including non-time series data. A customer may specify data in which to detect anomalies, such that may be performed by an anomaly detection service. This data may come from variety of different sources, such as customer managed applications, data stores, etc., and may have different characteristics, be in different formats, and have different attributes associated with it. In some cases, this data may not have any time information associated with it, such that the data does not itself include any indication of when it was generated, compiled, or recorded. In some aspects, the described techniques utilize a data ingestion layer or service that obtains customer data and transforms it into data that is usable or ingestible by an anomaly detection service, to identify anomalous data points within the data using time information. The data ingestion layer may append or add time information to the customer data, to convert the data to time series or time oriented data, which can be used by various anomaly detection models, to detect anomalies across one or more metrics or attributes within the data. In some cases, the customer data may be broken up into different portions or windows, according to a determined length of time for individual windows. Time information, such as a time stamp, may be added to the different portions or windows of customer data, indicating or corresponding to the time window in which the portion of data was captured. The result may be a number of equal sized portions or windows of data, each having a time stamp, that is in a time-series format. Using this converted time series data, patterns, and deviations from those patterns, in time of different attributes of the data may be determined for data that is not natively associated with time information. This may significantly increase the applicability of and use of existing time based anomaly detection models, to be sued on a larger variety of data sources.

In some aspects, different batches or portions of customer data may be obtained at set intervals (e.g., data ingestion intervals), such that each batch or portion of data that is ingested is associated with a time stamp corresponding to the data ingestion interval. In some cases, the interval length (e.g., 1 minute, 5 minute, 10 minutes, 1 hour, 1 day, etc.) may be selected or determined based on the underlying customer data, the relevant metrics or attributes thereof, and/or characteristics of the anomalies desired to be detected. In some cases, time zone or other information may be normalized across the data to ensure that anomaly detection is accurate for time-based anomalies when the data originates from or is associated with different time zones. In some cases, the customer data with appended time stamps may be further processed or modified to enable anomaly detection. In some cases this processing or preprocessing may include separating the data into different series of data points that each correspond to individual metrics or attributes. The resulting data sets may be stored in a data store accessible by an anomaly detection service, which may then utilize one or more trained detection models to determine if any of the data points represent an anomaly.

In some cases, a delay may be introduced between the time the customer data is converted into time series data and the time it is analyzed or processed by the anomaly detection service. This delay may be implemented to ensure that data is obtained and processed before the anomaly detection process begins. In some cases, when the time it takes to process the data is longer than the ingestion interval, multiple different portions or batches of data may be run through one or more anomaly detectors concurrently, to speed up processing time and ultimately detecting anomalies within the data more readily. In some examples, the customer data specified for anomaly detection may come from a software as a service (SaaS) application, such as provided by any of a number of different providers. In these examples, the data may first be ingested and saved into a data store. The SaaS application may be configured to push the data at the specified time interval, or when the data becomes available, to the data store. The data ingestion layer or service may then pull the data from that data store at times according to a specified data ingestion interval and append time information to the data. In other examples, the data may come directly from a data store, such that the data ingestion layer or service may simply pull the data from that data store. In yet some examples, the data may come from or be modified by a metrics service, such that is configured to detect certain metrics in raw customer data and add information to the customer data indicating the one or more metrics.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more robust and efficient anomaly detection across a wide range of input data, 2) data agnostic techniques to detect anomalies in data, and other benefits and advantages that are described throughout this disclosure.

FIG. 1 illustrates an example environment 100 in which a data ingestion layer 122 and an anomaly detection service 112 may be provided by a computing resource service provider 102. A client 104 may interact with the computing resource service provider 102 via a front end 108 of computing resource service provider 102 over one or more networks 106 to interact with various data and services, such as through one or more of a data ingestion layer 122, a metrics service 110, an anomaly detection service 112, a data storage service 124, and/or other services 120, as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of customer data or customer data source 128, a data ingestion layer 122, a metrics service 110, an anomaly detection service 112, a data storage service 124, and/or other services 120.

Client 104 may submit a request 130 for access to various computing resources (e.g., services or computing resources thereof) of computing resource service provider 102. The request 130, in some examples, is a web service application programming interface request (also referred to simply as a web service request), may be received by a service of the computing resource service provider 102. As illustrated, the client 104 may submit a request 136 to configure and interact with anomaly detection for customer data, such as may originate from a customer defined data source 128. The request 136 may be directed to one or more services provided by the computing resource service provider 102, and may include a request to access data and anomaly data relating thereto via a data ingestion layer 122, a metrics service 110, an anomaly detection service 112, a data storage service 124, and/or other services 120. In some cases, the request 130 may include anomaly data for configuring the anomaly detection service 112 to detect certain types or characteristics of anomalies, and/or identification of certain data to monitored for the detection of anomalies, such as data from customer data source 128.

In some examples, request 130 may include one or more of: an indication of a source of data to evaluate, a location of where to put detected anomalies, one or more metrics across which to detect anomalies, a time interval or granularity at which to detect anomalies/ingest the data, and/or a delay time that indicates a delay between ingesting the data and running it through an anomaly detection model. In some cases, the request may additionally or alternatively include an indication of what users are allowed to provide feedback, an initial configuration (such as sensitivity, indication of what is or is not of interest as anomalies, thresholds, etc.), what type of anomaly to detect, when to present an anomaly, an indication of who is to receive anomalies or indications of their existence, a namespace that includes the metric, a period for evaluation, a statistic or percentile to use, data points to alarm and/or provide an anomaly indication, an indication of treatment of missing data (treat as acceptable, ignore, treat as unacceptable, etc.), etc.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a data ingestion layer 122, a metrics service 110, an anomaly detection service 112, a data storage service 124, and/or other services 120 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 7. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a data ingestion layer 122, a metrics service 110, an anomaly detection service 112, a data storage service 124, and/or other services 122. Each of these services may provide ways for a customer to interact with various forms of data, including using the one or more services to detect anomalies in the data.

The data ingestion layer 122 may be a collection of computing resources or process configured to obtain various customer data, such as non-time series data 132 from a customer data source 128, and add time data to the non-time series data 132 to output time series data or converted time series data 134. In some cases, the data ingestion layer 122 may obtain customer data directly from a source 128, such as a customer application, database, etc. In other cases, data ingestion layer 122 may receive customer data that has been processed by a metrics service 110, for example, to distill the raw customer data into one or more metric values across one or more dimensions, for further analysis. In yet some cases, the data ingestion layer 122 may receive data from a source, such that the data is pushed to the data ingestion layer 122, for example, from an application or SaaS application, or other service, such as the metrics service 110. In other cases, the data ingestion layer 122 may pull the data from a source, such as in the case where the data source is a database or other data store. In some cases, data from the customer data source 128, metrics service 110, or other location, may first be stored in a data store (not shown), and then accessed from that data store. In some cases, data from customer data source 128, such as non-time series data, may first be received by front end 108 or other aspect of the computing resource service provider 102, and then routed to the data ingestion layer 122.

The data ingestion layer 122 may obtain non-time series data 132 and convert that data into time series data 134, and store that data with a data storage service, such as organized into one or more partitions, such as data source 126. A more detailed example of the data ingestion layer 122 will be described in greater detail below in reference to FIGS. 2 and 3.

As illustrated, the metrics service 110 may be a collection of computing resources configured to analyze data, such as from one or more data sources 126, 128, and/or obtain, organize, and or generate various metrics pertaining to that data. The metrics service 110 may access a data source, such as data sources 126, from a data storage service 124 provided by the computing resource service provider 102, and/or via other data sources maintained, stored, or accessed external to the computing resource service provider 102, such as a customer data source 128. The metrics service 112 may perform one or more of the following functions: collecting and storing logs, collecting metrics, including of non-time series data and time series data, aggregating metrics, generating alarms, etc., on the data. The metrics service 110 may generate metrics pertaining to a data source 126, 128, which may be used by an anomaly detection service 112 to detect anomalies within a data source 126. In some embodiments, the anomaly detection service 112 may in whole or in part be part of a metrics service 110. In other cases, the metrics service 110 and the anomaly detection service 112 may be separate. In some cases, the metrics service 110 may modify a data source in one or more ways, such as extracting only metrics of the data source that are relevant or specified (e.g., via request 130) for anomaly detection. In some cases, the metrics service 110 may then route the modified data source to the anomaly detection service 112. The metrics service 110 may generate or modify data to generate metrics data, which may be in time series format or non-time series format. In the example where the metrics service 110 outputs non-time series metrics data, the data ingestion layer 122 may add time data to the metrics data to generate time series data, such as data 134, that can be analyzed by anomaly detection service 112 to identify anomalies in that data.

The anomaly detection service 112 may be a collection of computing resources configured to analyze data, such as obtained and/or monitored from a data source 126 (e.g., which may include metric data that was generated or modified by the metrics service 110), on behalf of a customer 104 to detect anomalies within that data. In some aspects, the anomaly detection service 112 may generate or access one or more models, such as machine learning models, neural networks, etc., to be used in detecting anomalies within data from a data source 126. In some cases, the anomaly detection service 112 may interact with one or more of metrics service 110 and/or any of a variety of other services, such as may be provided by the computing resource service provider 102, to detect anomalies within various data of interest. In some cases, a data source (not illustrated) may reside in another service, such that the anomaly detection service 112 may receive data from the other service for analysis. In yet some cases, the anomaly detection service 112 may obtain metrics or other metadata of certain customer data, from another service and/or from metrics service 110 to be used in detecting anomalies within the data of interest. In other examples, the anomaly detection service 112 may obtain data from a data source external to the computing resource service provider 102, such as from customer data source 128, as may be modified by the data ingestion layer 122.

In some aspects, the anomaly detection service 112 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, such as to aid in creating models, and detecting anomalies or anomalous behavior within that data.

In some cases, the anomaly detection service 112 may use operational domain knowledge of metrics, provided by metrics service 110, to select and/or configure models and the training/using of the models to detect anomalies. In some examples, the anomaly detection service 112 generates artificial anomalies or indications or real thereof, from time series data provided by a data source, such as data source 126 stored by data storage service 124. The anomaly detection service 112 may include or have access to, a plurality of different machine learning models or other anomaly detection mechanisms, such as statistical models and the like. These models and algorithms may be used to analyze metrics of systems and applications, determine normal baselines, and surface anomalies with minimal user intervention. Enabling anomaly detection for a metric may cause the anomaly detection service 112 to access past metric data through the metrics service 110 to generate a model of the metric's expected values. The model may assess both trends and hourly, daily, and weekly patterns of the metric.

The anomaly detection service 112 may be configured to detect one or more anomalies within a data source, such as data source 126 across one or multiple metrics and/or dimensions. In some aspects, the anomaly detection service 112 may be configured to detect specific types or classes of anomalies, such as across one or multiple specific metrics. In other examples the anomaly detection service 112 may be configured to detect a variety of different types of anomalies across a wide variety of dimensions or metrics. In some cases, anomaly detection service 112 may monitor REST APIs, URLs, and website content, checking for unauthorized changes from phishing, code injection and cross-site scripting, and various other indications of events recorded by one or more applications, services, etc. Anomaly detection service 112 may monitor detect anomalies within a data source 126 with or without modifying the data in the data sources 126.

Based on the metrics (time series data) to evaluate, the anomaly detection service 112 may select one or more models to use in detecting anomalies within data. Types of anomalies and alarms differ between types of metrics, types of applications, etc. Annotating anomalies with types allows for the flexibility to pick the right type of anomalies based on the metric and/or user feedback. User feedback and unique metric requirements are used to adjust what model is used (for example, based on an annotation of a data set, anomaly, etc.), retrain a model, set different thresholds for reporting, etc. For example, user feedback may be used to: adjust importance of an anomaly or insight of the anomaly, adjust what type of anomalies are used to create an insight for a metric, etc. For example, if a user gives feedback that seasonal anomalies are not useful for a certain metric, those anomalies are muted. To get better feedback, the type of anomaly is used to generate explanations which are shown the user. For example, if the anomaly is due to trend changes, the user may be shown the explanation of how the trend changed. Domain knowledge may be used to annotate metrics and select which models are used by the anomaly detection service 112 to create anomalies and rules used for threshold based anomalies. Domain knowledge may also be used to determine when to alarm on an anomaly.

To handle unknown metrics, the anomaly detection service 112 may start in a conservative state such that only high threshold breaches generate alarms and other detectors are selected based on metadata annotator's analysis. For example, if a detector configuration generator classifies time series as continuous and stationary, change-point and missing-value detectors are typically selected. Alarms are adjusted based on user feedback. For example, for the custom metric, the user may provide feedback that threshold breaches at a lower end of the metric are not alarmable and thus new alarms for such an event are not generated.

In some cases, the anomaly detection service 112 may include an anomaly generator (not shown). The anomaly generator may be a process or processes executed by the anomaly detection service 112 to create artificial anomalies (e.g., data points), that can be injected into data, such as time series data, for purposes of training models to detect future anomalies. In some cases, the anomaly generator may access or obtain metrics data from metrics service 110 to aide in generating artificial anomalies or data points. In some aspects, the anomalies generated by the anomaly generator may be used to create and/or train one or models to be used for anomaly detection and classification, such as by the anomaly classifier 116. Details for generating artificial anomalies and using them to train anomaly detection models may be found in U.S. patent application Ser. No. 17/364,212, titled "NEURAL CONTRASTIVE ANOMALY DETECTION," filed on Jun. 30, 2021, the contents of which are herein incorporated by reference in their entirety.

The anomaly detection service 112 may also include an anomaly classifier 116. The anomaly classifier 116 may be a process or processes executed by the anomaly detection service 112 to detect anomalies or anomalous data points (or ranges of data points) within time series data. The anomaly classifier 116 may utilize one or more models, as will be described in greater detail below, to detect and classify certain segments of data, such as time series data.

In some examples, the computing resource service provider 102 may provide data storage through a data storage service 124 to store and manage large volumes of data, including image and other media data, which may collectively be referred to herein as a data source 120. In some cases, the data storage service 124 may interact with data ingestion layer 122, anomaly detection service 112 and/or the metrics service 110 to enable detection and/or generation of metrics relevant to data stored by the data storage service 124. Data storage service 124 may be an on-demand data storage service, such as an object-based data storage service, and may be configured to store various forms of media. The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

In some examples, data stored in the data storage service 124, which may collectively form a data source 120 may be organized into data objects, in one or more logical data containers. Data source 126 may be a collection of data having one or more similar attributes. In one example, a data source may be a collection of data spanning a certain time period, which is generated from or by a customer application or service, such as provided by the computing resource service provider 102. The data storage service 124 and/or the data source 126 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by the client 104 to retrieve or perform other operations in connection with the data objects stored by the data storage service 124. Access to the object-based data storage service 124 may be through application programming interface (API) calls to the service or via an interface, such as a graphical user interface (GUI).

In some aspects, data source 126 may include data obtained from a specific application or service, such as virtual computing resources including virtual machines, containers, etc., data storage services, and other services or entities running within or outside of the computing resource service provider. The data source 126 may include various metrics gathered by metrics service from another data source, logs, and other forms of data. In the primary example described herein, data source 126 may include time series data 134 that was converted to time series data from non-time series data 132 by data ingestion layer 122.

In some cases, the data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service, for example from either directly from client 104, or via the computing resource service provider 102. It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

Figure 2:
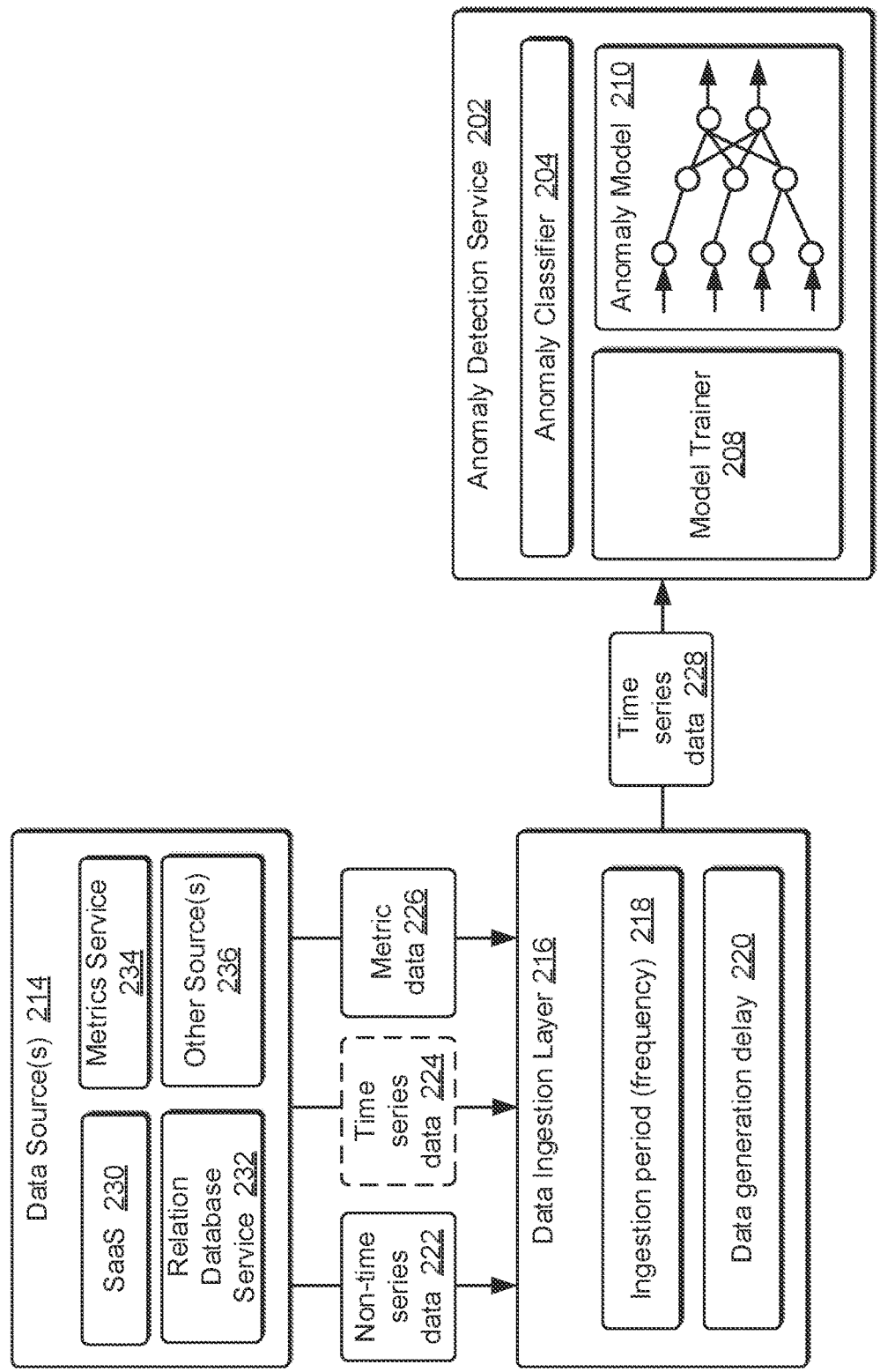
FIG. 2 illustrates an example of a data ingestion layer and an anomaly detection service in which the described techniques may be implemented.

FIG. 2 illustrates a more detailed example 200 of interactions between a data source 214, a data ingestion layer 216, and an anomaly detection service 202, which may be used, in combination to obtain data, convert it time series data, and detect anomalies within that data. Data sources 214, data ingestion layer 216, and or anomaly detection service 202 may include one or more aspects of similarly named components or services as described above in reference to FIG. 1. The data source 214 may include any of a number of different data sources and different types of data sources, such as SaaS application 230, a relational data base or service 232, a metrics service 234, or other data source 236. In some cases, the customer, such as in a request 130, may specify the data source 214, such as via any type of an identifier, including IP address, resource name, such as may be assigned by a computing resource service provider 102 that provides the service or data source, or via other types of identifiers.

In various cases, the data ingestion layer 216 may obtain one or more of non-times series data 222, time series data 224, and/or metrics data 226 from a data source. The data ingestion layer 216 may identify which type of data it is receiving based on characteristics of the data and/or a source that it is being obtained from, to determine what processing to do to the data to make it suitable for processing by the anomaly detection service 202. In some cases, detection of a field in the data indicating some type of time information, such as creation time, upload time, or time stamp information may be used to determine that the data is time series data 224. In other cases, the lack of such information may be an input to determining that the data is non-time series data 222, and needs to be modified to have time information associated with it, for use by the anomaly detection service 202. In some cases, such as determining that metric data 226 is at least part of the input data, the data ingestion layer 216 may simply use an indication of the source to determine what type of data it is. In some cases, the data source information 214 and/or other information indicating what type of data it is, may be contained in the data itself, may be determined from the data itself, or may be made available from configuration parameters from a given ingestion pipeline or route, which may be configured by a customer.

Based on the type of data being obtained the data ingestion layer may determine what processing or pre-processing to perform on the data to then output time series data 228 that can be used by the anomaly detection service 202 to detect anomalies within the data. In some cases, time series data 224 that is obtained by the data ingestion layer 216 may be passed through to the anomaly detection service 202. In other cases such as where the time information of the time series data 224 is not consistent or not consistent with other data that is being processed with the time series data, the time series data 224 may be treated as non-time series data, and consistent (e.g., of the same format, at specified intervals) time information may be added to the data to enable more accurate anomaly detection for that data. Metrics data 226 may be data obtained from metrics service 234. In some cases, metrics data 226 will have time information associated with it that is in a usable form to be processed by the anomaly detection service, and as such can be treated as time series data. In other cases, where no consistent time information is associated with the metrics data 226, it may be treated as non-time series data.

In cases where non-time series data 222 is obtained by the data ingestion layer 216, which may include metrics data 226 and/or some time series data 224, time information may be added to the data 222 to create converted time series data 228. As used herein, non-time series data may be data that is not associated with item information, such as time information indicating when the data was created, uploaded, ingestion, etc., by one or more sources or entities. Examples of this type of information may include any type of metrics information or values, across any number of dimensions, about performance of one or more computing resources in providing service, network characterize related thereto, click rate, purchase rate, and various other data. The time information added may be of a variety of formats, such as may be usable by the anomaly detection service 202. The time information may include some indication of ingestion time, by the data source 214 or the data ingestion layer 216, or creation time by the data source 214, or some other indicator of a time some operation was performed on or with the data.

In some cases, the time information be a time stamp, such as of the format year-month-day; hour:minute:second. Although various other formats, and varying degrees of precision are contemplated herein. In some case, the time information may correspond to the time the data is ingested by the data ingestion layer 216. In some examples, the time stamp for a batch of data, such as ingested in one specified time interval, may all be associated with a single time stamp, such the beginning, middle or end of the interval. In some cases, the time stamp or other time information be correspond to a time when the data was sent from a data source 214, received at a temporary data store, or other specific points in time in the process from data generation to the data being received by the data ingestion layer 216.

In some cases, the data ingestions layer 216 may pull the data from a data source 214, such as when the data source is from a relational database service 232, or a metrics service 234. In other cases, the data source 214, may push the data to the data ingestion layer 216, such as in the case where data source is a SaaS application 230. In this example, the data ingestion layer 216 may store the data prior to processing it (e.g., temporarily), such as with a data storage service in a data bucket or other data partition. In some cases, however, the push or pull mechanism for obtaining the data may be switched for a given resource, such as may be dictated by how data is generated at the source 214, how frequently the data is generated, network connectivity between the source and data ingestion layer 216, and/or based on a variety of other factors. In yet some cases, the data source 214 may include on or more other sources 236, such as may include external applications, data stores, streaming data, etc.

In some cases, the data ingestion layer 216 may utilize and/or configure an ingestion time period or frequency 218, by which data will be grouped into windows or portions. This ingestion interval may be configured based on a desired granularity of anomaly detection for the data. For example, if the data ingestion period is set for 5 minutes, each portion or batch of data processed by the anomaly detection model will span 5 minutes windows. This may enable a higher precision in detecting variations and anomalies in various metrics or dimensions of the data, such that dimensions in the data may meaningfully change within 5 minute intervals. In other cases, longer data ingestion intervals may be used, such as 10 minutes, 1 hour, 2 hours, up to 12 hours, 24 hours, a week, a month, etc., based on the types of anomalies desired to be detected. In some cases, the customer may select the data ingestion interval, such as through a user interface provided by a computing resource service provider 102/through one or more requests 130 or interactions with the provider 102. In other cases, a data ingestion interval may be automatically selected by the data ingestion layer 216/the anomaly detection service 202 based on characteristic of the data itself, the data source, the type of data source. In yet some cases, the ingestion interval may be modified, e.g., automatically, based on historical data/data that is currently being processed, to enable more useful and intuitive anomaly detection.

In some cases, the data ingestion layer 216 may utilize a data generation delay 220, such as may be set by default or specified by a customer. The delay time period may introduce a delay between when data, such as data 222, 224, 226 is ingested, grouped or partitioned into windows and when it is sent to the anomaly detection service 202 as time series data 228. In some cases, when large amounts of data are ingested with a smaller ingestion time interval, the data ingestion layer 216 may not be able to process all the data obtaining during that interval, in the time of one time interval. In these scenarios, a delay may be introduced so that all the data from one data interval may be sent or made available to the anomaly detection service at a single point in time, to facilitate more accurate anomaly detection. It should be appreciated that the delay item period may be set as any of a variety of numbers, but will typically be between a fraction of a ingestion time interval and potentially 1-5 times that interval, such as to ensure that anomaly detection is performed at least close in time (e.g., near-real-time) with the data being obtained.

Anomaly detection service 202 may incorporate one or more aspects of anomaly detection service 112 described above in reference to FIG. 1. In the illustrated example, anomaly detection service 202 may include an anomaly classifier 204, a model trainer 208, and one or more anomaly models 210. The anomaly detection service 202 may obtain time series data 228 from data ingestion layer 216, either directly or indirectly, such as through one or more data stores.

Anomaly classifier 204 may utilize various data, and/or models 210 to characterize portions of data within data source as anomalous. The anomaly classifier 204 may ingest data, such as from any of data sources 214, and determine whether anomalies exit within that data. This may include obtaining data and segmenting the data into segments or windows, such as corresponding to different time periods within time series data. As used herein, time series data may refer to any collection of data that includes a series of data points in time order. Examples described herein refer primarily to time series data. Ain some cases, data may be segmented into windows, and further segmented into context and suspect windows, whereby the data in a window may be compared to data in another window to determine if an anomaly exists in one of the windows. The anomaly classifier 204 may utilize one or more anomaly models 210 to determine if certain data within a data source has one or more characteristics of an anomaly. The anomaly classifier 204 may obtain data, segment it into one or more windows, and compare the data within at least one window, or a representation thereof, to the model 210 to determine if that data is consistent with an anomaly. The anomaly classifier 204 may output a score, which may then be compared to one or more thresholds, to determine if the data of interest contains an anomaly.

In some cases, anomalies may be defined or characterized in a number of different ways, such as value or range based (e.g., if latency is above this threshold, or data throughput is outside of a given range), relative difference (e.g., more than 20% difference from values within a certain time period), and so on. In some cases, anomalies may be initially defined in such a way, where a model may be trained to detect such anomalies. This may be accomplished by setting thresholds that can be used to classify data as within the normal bounds of expected data or outside of these bounds, or anomalous.

In some cases, the anomaly classifier 204 may determine which metrics are of interest for anomaly detection. In some examples, the metric or metrics for which anomalies are to be detected may be specified in a request to configure the anomaly detection service 202, such as in request 130 described above in reference to FIG. 1. In this example, only relevant portions of the data may be analyzed to detect anomalies, where the portions analyzed are selected based on what metrics are of interest. In other examples, data may be analyzed for a variety of different anomalies spanning multiple and in some cases, unspecified metrics.

In some cases, the anomaly classifier 204 scans for metrics (e.g., from a metrics service 110) to determine which metrics to add or delete for anomaly detection. In some embodiments, metrics are added/deleted by specific user request. In some embodiments, the anomaly classifier 204 formats the time series data 228 prior to analyzing it and/or presenting it to model trainer 208 to be input into one or more models 210.

Model trainer 208 may receive as inputs time series data 228 from the data ingestion layer, data directly from one of data sources 230, 232, 234, 236, and/or from other sources of time series data that may share one or more characteristics with time series data 228. In some cases, the model trainer may receive supervised or annoyed data that specifics which data points are anomalous. The model trainer 208 may then create and modify one or more models 210 using the unsupervised data and supervised data or labeled anomalies. In some cases, the model trainer 208 may use a contrastive loss function to map similar data to be similarly represented in at least one dimension within the model 210. This may take the form of a distance metric, such that similar data points may be mapped as having a small distance between them, whereas a normal data point and an anomalous data point may have a greater distance between them. In other cases, a variety of other functions may be used to map or represent various data points within model 210, such that the model 210 can then be used to differentiate between normal or expected data points and anomalous data points.

Anomaly model(s) 210 may include any of a variety of different types of models, including various machine learning or deep learning models, neural networks, etc. In some examples, model 210 may include one or more convolution neural networks, and/or may utilize structural equation modelling. Model(s) 210 may be trained by model trainer 208 in various ways.

In some aspects, the model trainer 208 takes in metric metadata (domain knowledge such as known latency metrics, etc.), the time series data (metrics), system update information, (global usage knowledge such as an analysis of data usage in the provider network), and/or other forms or sources of data to configure one or more models 210 for anomaly detection. In some cases, the model trainer 208 uses this and/or other information to determine which of multiple models 210 to use for a specific request/type of data to be used to detect potential anomalies within the time series data.

In some embodiments, the model trainer 208 analyzes metrics and determines attributes (annotations) to the data for use by the anomaly classifier 204/model(s) 210. Examples of annotations include, but are not limited to: a metric resource type (stream, database, etc.); a metric type such as throttle, request rate, latency, error rate, custom, etc.; metric features such as seasonality period(s), stationary, etc.; metric limit thresholds; and metric domain knowledge. The model trainer 208 uses this information to configure one or more of models 210. The configuration may include one or more of: the metric to evaluate, how to configure the model, domain knowledge metadata of interest (e.g., thresholds, aggregation information), and the time series data. The model trainer 208 may also receive user feedback to adjust model sensitivity, what items are not of interest (which can then be used to retrain a model to ignore an observation), etc.

The anomaly classifier 204 takes in time series data (and in some instances metric metadata) as input and generates, as configured, anomaly indications as events (event start/end) and type as output. In some embodiments, the anomaly indications include a score. In some cases, the score may be a numeric score (e.g., from 1-10, 1-100, etc.). In some cases, multiple indications are collected and then compared to one or more thresholds before determining if an anomalous has been detected.

Figure 3:
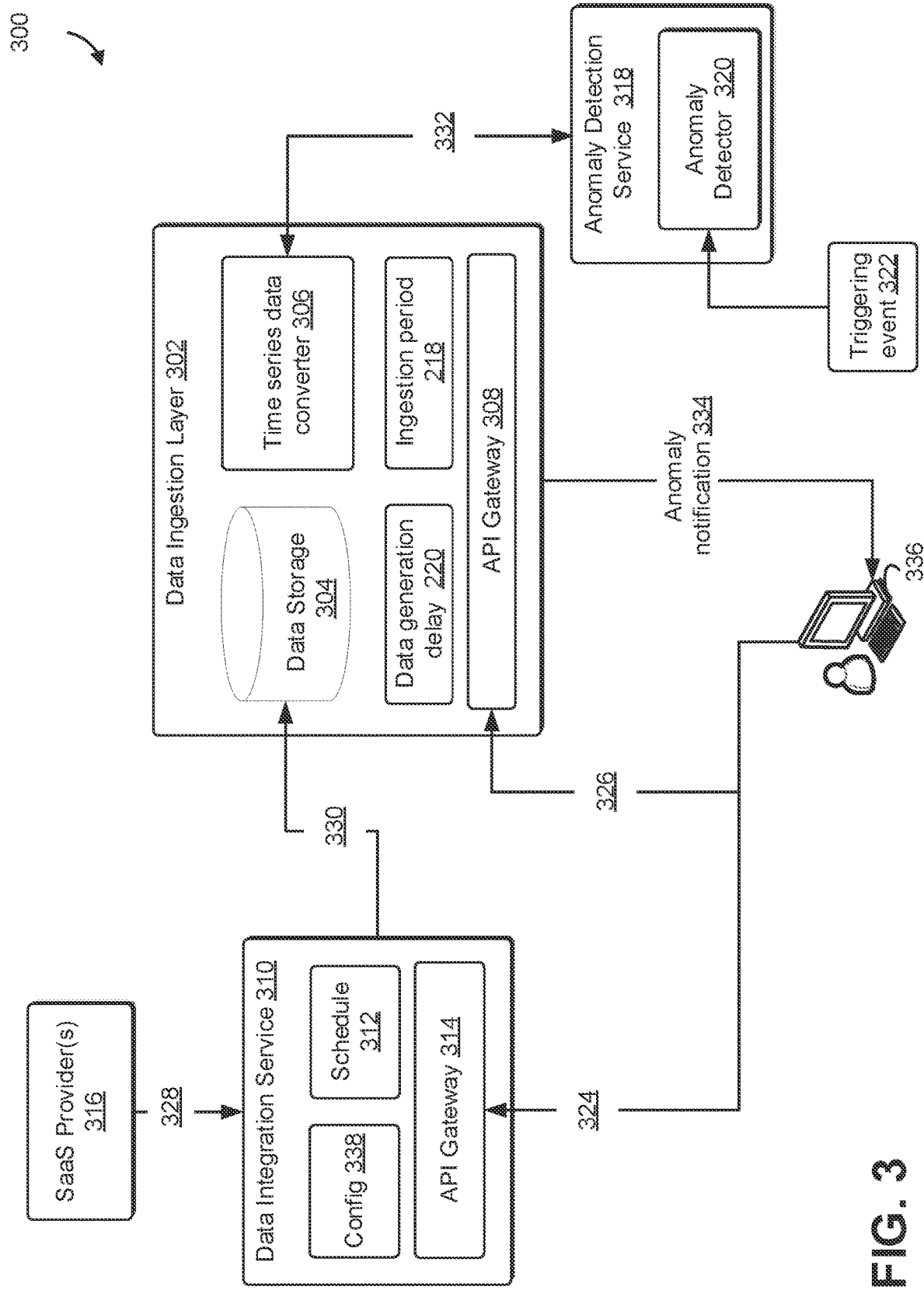
FIG. 3 illustrates an example process for converting non-time series data into time series data for anomaly detection, according to at least one embodiment.

FIG. 3 illustrates an example process 300 for converting non-time series data into time series data for anomaly detection, such as may be received from one or more SaaS providers 316. SaaS providers 316 may incorporate one or more aspects a data source, such as any of data sources 128, 214, or 230 as described above. Similarly, data ingestion layer 320 and/or anomaly detection service 318 and anomaly detector 320 may incorporate one or more aspects of summarily named components or services as described above in reference to FIGS. 1 and 2.

A customer or client 336, via one or more computing devices may establish a data flow via a request 324 with a data integration service 310 via an API gateway 314 of the data integration service 310. The data integration service 310 may be collection of computing resources configured to manage ingesting data 328 from various sources, such as one or more SaaS providers 316. In some cases, request 324 may include configuration details 338 for establishing a data flow to ingest data from a SaaS provider 316, modify the data and store it in a specified location, such as may be further used by a data ingestion layer 302 and/or an anomaly detection service 318. In some cases, request 324 may indicate the data source (e.g., SaaS provider 316), and a schema or specification of what types of data and in what form the customer would like the data imported. In some cases, the schema selected may be from a predefined list or may include customer data schemas. In one example, where Zendesk is the SaaS provider 316, the available schemas may include a user or a ticket schema. In other examples, various other schemas may be used or custom defined to facilitate importing data in a workable format by the data ingestion layer 302 and/or the anomaly detection service 318. In some cases, request 324 may also specify a destination of the imported data 328, such as one or more data stores 304 available to the data ingestion layer 302. In some cases, the request 324 may also specify what data fields of a selected schema the customer wants to import and run anomaly detection on.

Once the data flow has been configured with the data integration service 310 via configuration details 338, a schedule 312, such as defined by the SaaS provider 316, may trigger pushing data 328 from the SaaS provider 316 to the data integration service 328, to activate the data flow path or route. In some cases, the schedule 312 may be defined by the customer 336, the SaaS provider 316, or a combination thereof. In some cases, the schedule may correspond to a data ingestion interval, which may be specified by the customer, such as with request 324 or 326. Upon obtaining data 328 from the SaaS provider 316, which as described herein may be non-time series data, or have some time information associated with it but that does not correspond to the specified data ingestion interval, the data integration platform would send the data 330 to a data store 304, such as via a prefix path that is based on a timestamp of the time the data 328 was ingested by the data integration service 310. In some cases, the storage location of the data 330 may include a customer ID and the time stamp information of the data.

The customer 336 may also configure details of ingesting the data and detecting anomalies within that data with the data ingestion layer 302, such as through an API gateway 308 provided by the data ingestion layer 302, via interacts or request 326. In some cases, the customer 336 may specify in the request 326 a metric set specifying what metric or metrics the customer 336 wants the anomaly detections service 318 to search for anomalies across. In some cases, the metric set may be validated with the data integration service 310 to verify that the metrics information will be obtainable. Once this validation has occurred, one or more anomaly detectors 320 may be selected and activate to process the incoming data 328. In some cases anomaly detection may be specified or configured to start after a time delay.

In some cases, a triggering event 322, such as validation of the anomaly detection request 326, or a message or indication received from the data integration service 310, may initiate anomaly detection by one or more anomaly detectors 320. In some cases, the anomaly detection service 318 may be utilized in this way as an on demand service, managed by the data integration service 310. The data ingestion layer 302, as described in detail above, may then obtain the stored data from data storage 304. In some cases, the time stamp information may already have been added to the data by the data integration service 310. In this scenario, the data ingestion layer 302 may simply make the data from data storage 304 available (either push the data to the anomaly detection service 318 or the anomaly detection service 318 may pull the data from data storage 304). In some cases, the storage location of the data in data storage 304 may indicate the time stamp. In other cases, the data ingestion layer 302 may add time stamp information to the data, such as using a time series data converter process 306. The anomaly detection service 318, upon detecting an anomaly, or upon completion of processing a certain portion of the data, may route one or more notifications 334 to the customer 336, such as through the data ingestion layer 302.

Figure 4:
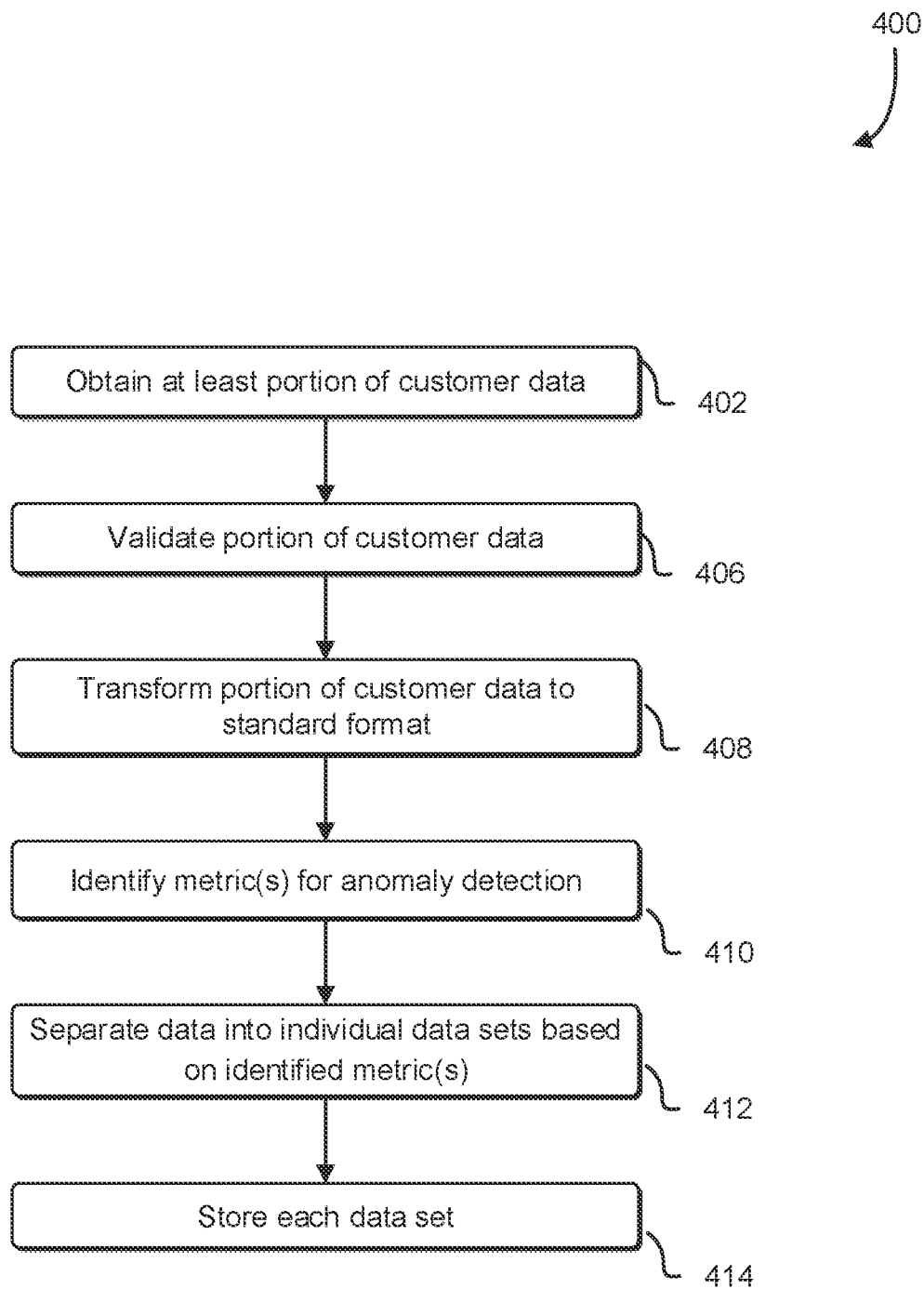
FIG. 4 illustrates an example process for pre-processing data such that it is usable by an anomaly detection service, according to at least one embodiment.

FIG. 4 illustrates an example process 400 for pre-processing data such that it is usable by an anomaly detection service. In some aspects, process 400 may be performed by one or more of a data integration service 310, and a data ingestion layer or service, such as data ingestion layer 122, 216, 302 as described above in reference to FIGS. 1-3.

Process 400 may begin at operation 400, in which at least a portion of customer data may be obtained, such as from a data source. The portion of customer data may then be validated, to ensure that it includes information concerning a metric or metrics of interest, such as may be selected for anomaly detection, as described above in reference to FIG. 3. In some cases, the customer data or a portion thereof may be transformed, at operation 406, such as to place the data into a standard format usable by an anomaly detection service for anomaly detection.

Process 400 may further include identifying one or more metrics selected for anomaly detection for the customer data, at operation 408. Operation 408 may include obtaining the metrics set as specified in the anomaly detection request, such as request 130, 324, or 326 described above. In some cases, such as when more than one metric is identified in the metrics set, or when multiple metrics are present in the data, the customer data may be separated out into different data sets, with each data set corresponding to a different metric, at operation 412. In some cases, each data set may be stored, at operation 414, as a different row in a table, or other partition in various other data structures, such that each data set may be accessible by a data ingestion layer or an anomaly detection service, to increase granularity of anomaly detection across one or more specified metrics or dimensions in the customer data.

Figure 5:
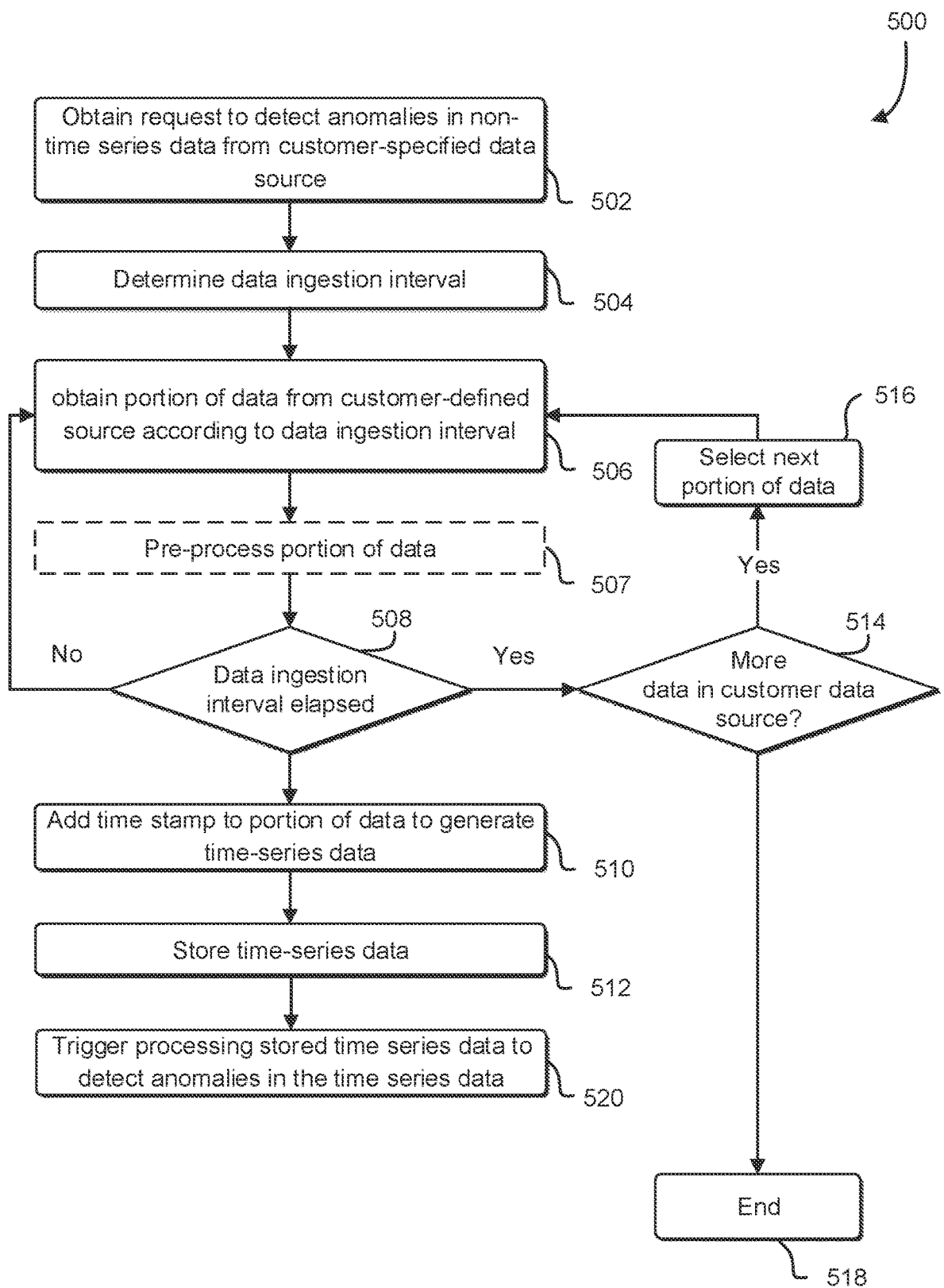
FIG. 5 illustrates an example process for converting non-time series data into time series data for anomaly detection, according to at least one embodiment.

FIG. 5 illustrates an example process 500 for converting non-time series data (or customer data that has time information that is not usable for anomaly detection) into time series data for anomaly detection. In some aspects, process 500 may be performed by a data ingestion layer or service, such as data ingestion layer 122, 216, 302, a metrics service 110, 234, and/or an anomaly detection service 110, 202, 318, and as described above in reference to FIGS. 1-3.

Process 500 may begin at operation 502, in which a request to detect anomalies in on-time series data from a customer-specified data source, may be received or obtained such as by a computing resource service provider and/or data ingestion layer, as described above. In some cases, the request may specify the data source, such as any of data sources 214 described above, and/or may include a time ingestion interval, a delay time, one or more metrics of interest for anomaly detection within the data, and a destination address for the data. In some cases, the request may include one or more aspects of request 130, 324, 326 described above. Next, at operation 504, a data ingestion interval or anomaly detection granularity value may be determined. In some cases, this value may be included in the request received at operation 502. In other cases, this value may be automatically determined, such as including a default value (e.g., 5 minutes, an hour, etc.), and/or based on one or more characteristics of the data, the data source, the type of data included, etc.

Process 500 may continue to operation 506, in which a portion of the data from the customer-defined data source may be obtained according to the data ingestion interval. In some cases, operation 506 may include pulling or fetching the data from a data source, or receiving the data from a data source, such as in the SaaS example described above in reference to FIG. 3. In some optional implementations of process 500, operation 507 may then be performed, including pre-processing the portion of the data. In some cases, operation 507 may include one or more aspects of process 400 described above in reference to FIG. 4.

Process 500 may then proceed to operation 508, in which it may be determined if a data ingestion interval has elapsed. If not, process 500 may continue to loop back through operations 506, 507, and 508, until the data interval has been determined to have elapsed. If so, the process 500 may proceed to operations 510 and 514. At operation 510, time stamp or other information may be added to the portion of data aggregated during the time window (specified by the data ingestion interval) to generate time series data, via the techniques described above. The time series data my then be stored, at operation 512, such as in one or more data stores (e.g., in some cases with naming conventions that indicate the time information). Next, at operation 520, an anomaly detection process or service may be triggered to analyze the converted time series data to detect any anomalies within that data 514 and 520.

At operation 514, it may be determined if more data is available or exists from the customer data source. If no, then process 500 may end at operation 518 (upon completion of operation 520). If, however more data is available, a new portion of customer data may be selected or identified, at operations 516, and process 500 may loop back to operations 506-520, to continue to convert and process more non-time series data to detect anomalies in that data using time-based anomaly detection techniques.

In some aspects, time series data may refer to data that is a unique combination of dimension values and a metric name, not necessarily a metric value. An example data set is provided below. This data set may be input into the data ingestion layer, as described above, and correspond to data that is received by the ingestion layer at hour 7:00 of 11/09/2019:

| device-type | country | campaign-id | revenue | cost | time-stamp |
|---|---|---|---|---|---|
| Android | CA | 456 | 150 | 30 | 2019-11-09T07:00:00 |
| iOS | CA | 358 | 260 | 40 | 2019-11-09T07:05:00 |
| Android | CA | 456 | 160 | 40 | 2019-11-09T07:05:00 |
| Android | CA | 456 | 150 | 60 | 2019-11-09T07:10:00 |
| iOS | US | 997 | 140 | 50 | 2019-11-09T07:10:00 |

The above data set may be transformed to the following data set, with each row representing a different time series of data, such as by process 400:

| | | | |
|---|---|---|---|
| Android | CA | 456 | Revenue |
| Android | CA | 456 | Cost |
| iOS | CA | 358 | Revenue |
| iOS | CA | 358 | Cost |
| iOS | US | 997 | Revenue |
| iOS | US | 997 | Cost |

Additional data may be received at the hour 8:00 11/09/2019:

| device-type | country | campaign-id | revenue | cost | time-stamp |
|---|---|---|---|---|---|
| Android | CA | 456 | 160 | 35 | 2019-11-09T08:00:00 |
| iOS | CA | 358 | 270 | 45 | 2019-11-09T08:05:00 |
| Android | CA | 456 | 170 | 45 | 2019-11-09T08:05:00 |
| Android | CA | 456 | 160 | 65 | 2019-11-09T08:10:00 |
| iOS | US | 997 | 150 | 55 | 2019-11-09T08:10:00 |

This data may be further converted into time series, via the techniques described above, such as according to one or more of process 500 and/or 600 described herein:

| device-type | country | campaign-id | revenue | 2019-11-09T07:00:00 | 2019-11-09T08:00:00 |
|---|---|---|---|---|---|
| Android | CA | 456 | Revenue | 460 | 490 |
| Android | CA | 456 | Cost | 130 | 145 |
| iOS | CA | 358 | Revenue | 260 | 270 |
| iOS | CA | 358 | Cost | 40 | 45 |
| iOS | US | 997 | Revenue | 140 | 150 |
| iOS | US | 997 | Cost | 50 | 55 |

For each inferencing of one time series, such as by an anomaly detection model, only one line would have to be read. In other examples, the data may be structured or formatted differently, such that multiple lines in a table, similar to the examples above, may be used to represent a single time series.

Figure 6:
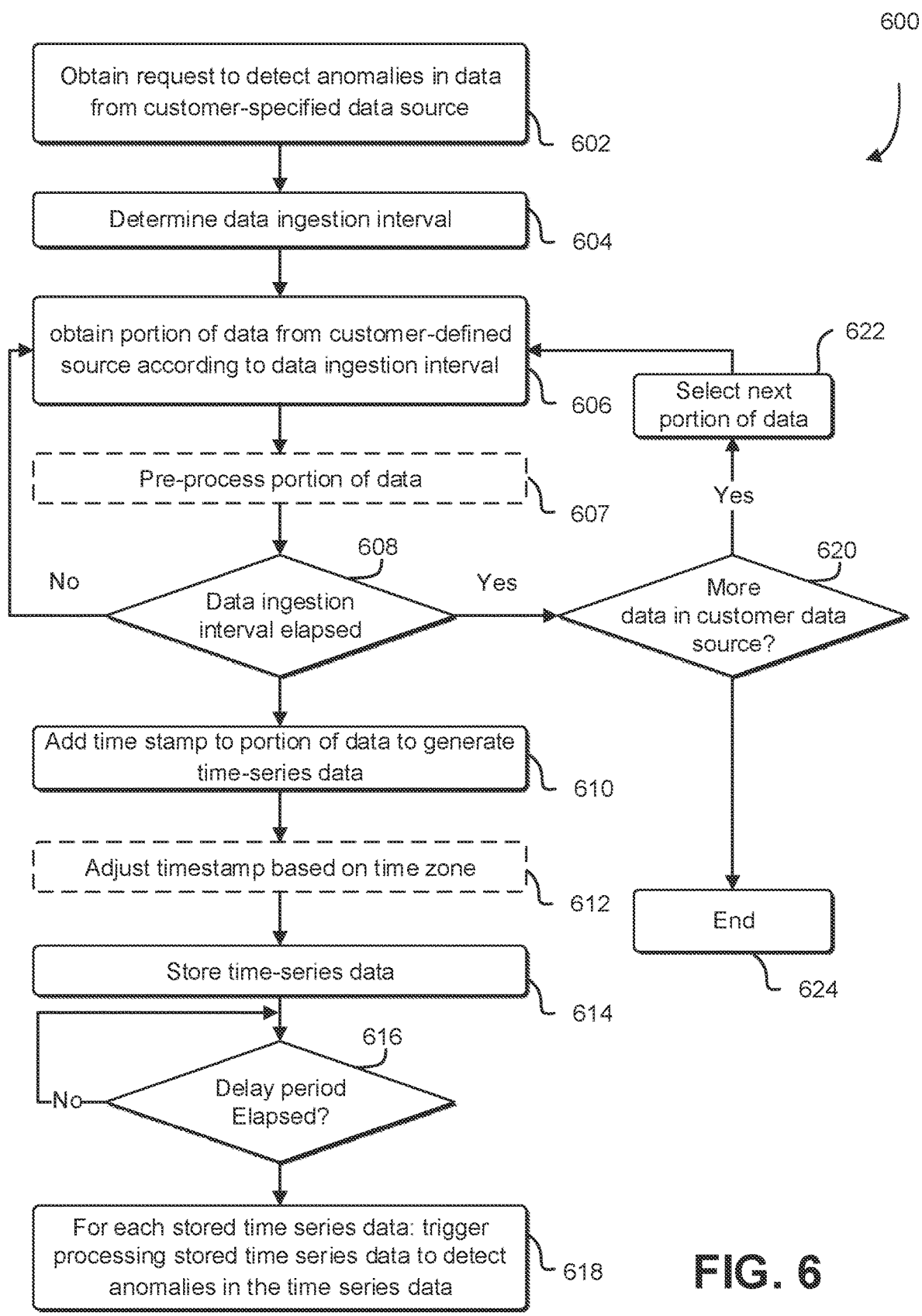
FIG. 6 illustrates another example process for converting non-time series data into time series data for anomaly detection, according to at least one embodiment.

FIG. 6 illustrates another example process for converting non-time series data into time series data for anomaly detection. In some aspects, process 600 may be performed by a data ingestion layer or service, such as data ingestion layer 122, 216, 302, a metrics service 110,234, and/or an anomaly detection service 110, 202, 318, and as described above in reference to FIGS. 1-3. Process 600 may share one or more aspects of process 500, and for the sake of brevity, those aspects will not be described in detail again here.

Process 600 may begin at operation 602, in which a request to detect anomalies in data from a customer-specified data source, may be received or obtained such as by a computing resource service provider and/or data ingestion layer, as described above. In some cases, the data may include non-time series data, or data that is not associated with time information corresponding to when the data was generated, recorded, etc. In other cases, the data may include some type of time information, but the time information may not be usable to detect anomalies at a given frequency, such as may be specified by a customer. Next, at operation 604, a data ingestion interval or anomaly detection granularity value may be determined. Next, at operation 606, a portion of the data from the customer-defined data source may be obtained according to the data ingestion interval. In some optional implementations of process 500, operation 607 may then be performed, including pre-processing the portion of the data, such as via one or more operations of process 400 described above in reference to FIG. 4.

Process 600 may then proceed to operation 608, in which it may be determined if a data ingestion interval has elapsed. If not, process 600 may continue to loop back through operations 606, 607, and 608, until the data interval has been determined to have elapsed. Once the data ingestion interval has elapsed, process 600 may proceed to operations 610 and 620. At operation 610, time stamp or other time information may be added to the portion of data to generate time series data, via the techniques described above. In some cases, optionally, the time stamp may be adjusted according to a time zone corresponding to the time at which the data was ingested, at operation 612. In some cases, operation 612 may include normalizing all data from a customer data source to one standard time zone, or may include adjusting some of the data to correspond to a time zone of other portions of the data. The time series data my then be stored, at operation 614, such as in one or more data stores.

At operation 616, it may further be determined if a delay period, such as may be specified in the request obtained at operation 602, has elapsed since the time when the data was stored. If yes, an anomaly detection process or service may be triggered, such as for each stored time series of data, at operation 618, to analyze the converted time series data to detect any anomalies within that data.

At operation 620 (following operation 608, and in some cases performed in parallel with operations 610-618), it may be determined if more data is available or exists from the customer data source. If no, then process 600 may end at 624 (upon completion of operation 618). If, however more data is available, a new portion of customer data may be selected or identified, at operations 622, and process 600 may loop back to operations 606-624, to continue to convert and process more non-time series data to detect anomalies in that data using time-based anomaly detection techniques, until there is no more customer data to analyze, and process 600 may end at 624.

Figure 7:
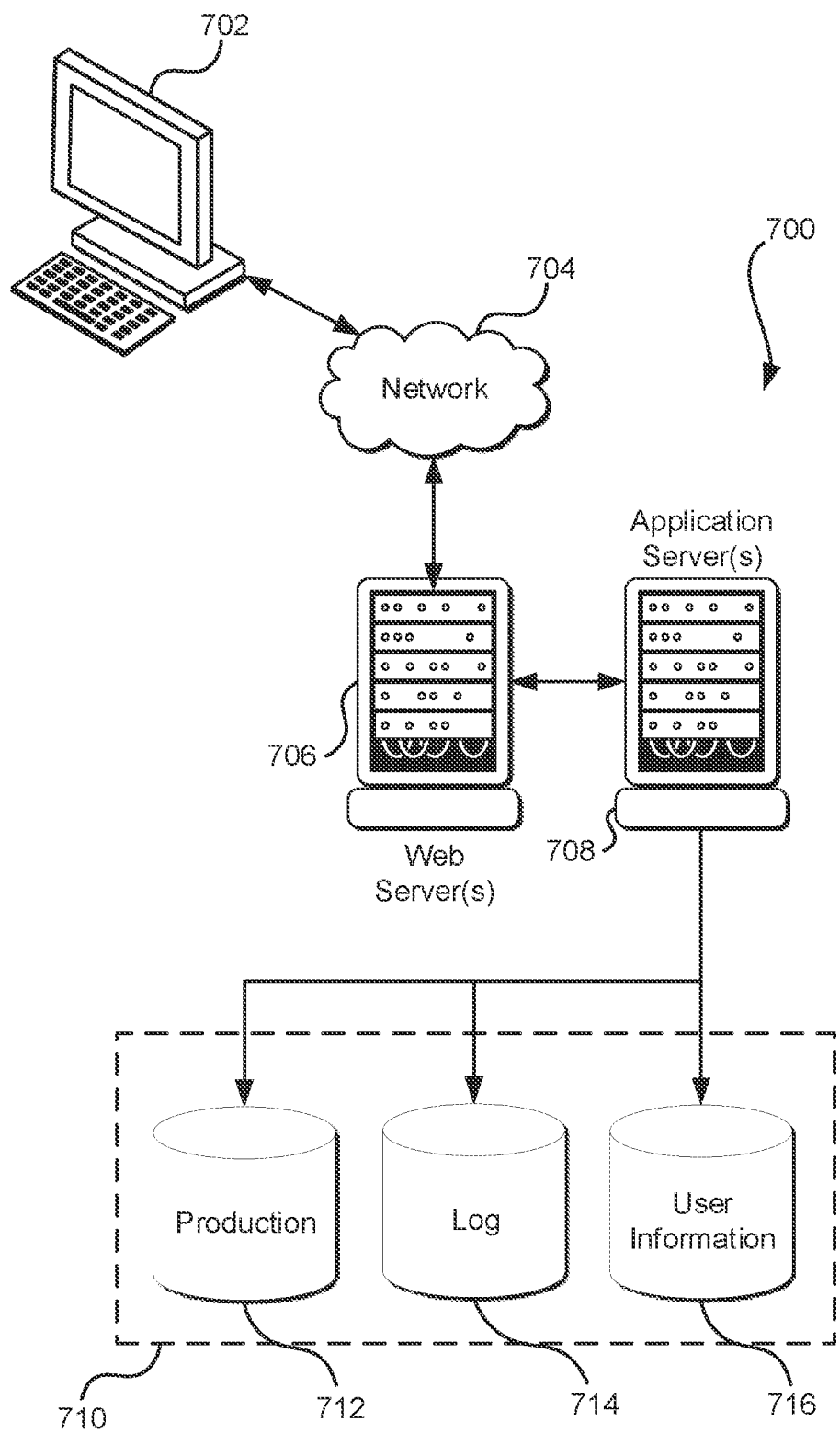
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network.

As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 708 may host a data ingestion layer 122, 216, 302 and/or an anomaly detection service, such as service 110, 202, 318 as described above. The anomaly detection service 110, 202, 318 may obtain data from data source which may be store or obtained from data store 710. In other cases, data source may originate or be obtained other services, such as hosted by application server(s) 708.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:
   obtaining a request to detect anomalies across a first metric in data from a client data source, the request comprising a frequency of detection for the first metric in the data from the client data source;
   identifying a first time window of the data, wherein a length of the first time window is determined based on the frequency of detection;
   determining that the data in the first time window is not associated with time information corresponding to the frequency of detection;
   based on the determining, appending a first time stamp to the data in the first time window to generate first time series data;
   identifying a second time window of the data, the second time window comprising the length of time;
   appending a second time stamp to the data in the second time window to generate second time series data; and
   processing the first time series data and the second time series data concurrently using a time series data anomaly model by an anomaly detection service, to detect one or more anomalies in the first metric across the first time series data and the second time series data.

2. The computer-implemented method of claim 1, wherein the request further comprises a time delay indicating a time between the appending the second time stamp to the data in the second time window and processing the data to detect anomalies, wherein processing the second time series data is performed upon completion of the time delay after the second time stamp.

3. The computer-implemented method of claim 1, wherein the data in the first window of time comprises data that is associated with time information that does not correspond to the frequency of detection.

4. The computer-implemented method of claim 1, wherein the data in the first time window and the data in the second time window are received from a software as a service application.

5. A system, comprising:
   at least one processor;
   memory that stores computer-executable instructions that, as a result of being executed by the one or more processors, cause the system to:
      determine a data ingestion interval, the data ingestion interval specifying a length of time during which the data is aggregated into a plurality of portions of data, the data ingested from a data source by an anomaly detection service;
      obtain a portion of the data of the plurality of portions of the data from the data source during a first time window according to the data ingestion interval;
      convert the portion of the data into converted time series data by appending a time stamp corresponding to the first time window to the portion of the data; and
      cause the anomaly detection service to process the converted time series data, using a time series data anomaly model, upon expiration of a delay time period after the first time window, to detect one or more anomalies in the converted time series data.

6. The system of claim 5, wherein the computer-executable instructions further include instructions that further cause the system to:
   obtain, by the anomaly detection service, a request to detect anomalies in the data, the request comprising the delay time period.

7. The system of claim 5, wherein the computer-executable instructions further include instructions that further cause the system to:
   obtain a second portion of the data from the data source during a second time window according to the data ingestion interval;
   convert the second portion of the data into second converted time series data by appending a second time stamp corresponding to the second time window to the second portion of the data; and
   cause the anomaly detection service to process the second converted time series data, using the time series data anomaly model by the anomaly detection service, to detect one or more anomalies in the second converted time series data.

8. The system of claim 7, wherein the computer-executable instructions further include instructions that further cause the system to:
   cause the anomaly detection service to process the converted time series data and the second converted time series to detect one or more anomalies concurrently.

9. The system of claim 7, wherein the first portion of data is associated with a first time zone and the second portion of data is associated with a second time zone, and wherein the computer-executable instructions further include instructions that further cause the system to:
   convert the second time stamp to the first time zone.

10. The system of claim 5, wherein the time series data anomaly model is trained with time series data to detect anomalies occurring over time.

11. The system of claim 5, wherein the data from the data source comprises non-time series data.

12. The system of claim 5, wherein the computer-executable instructions that cause the system to obtain the portion of the data from the data source further include instructions that further cause the system to:
   receive the portion of the data from an application according to the data ingestion interval.

13. The system of claim 5, wherein the computer-executable instructions that cause the system to obtain the portion of the data from the data source further include instructions that further cause the system to:
   pull the portion of data from the data source at according to the data ingestion interval.

14. The system of claim 5, wherein the data source comprises a data partition, and wherein the data comprises metric data generated by metrics service and stored in the data partition.

15. A non-transitory computer-readable storage medium storing thereon executable instructions that, as a result of being executed by one or more processors of a computer system, cause the computer system to at least:
   obtain a plurality of portions of data over different time windows from a data source according to a data ingestion interval;
   convert individual portions of the plurality of portions of the data into converted time series data by appending individual time stamps indicating a time window corresponding to the individual portion of the data, wherein the individual portions of the plurality of portions of the data are not associated with a time the individual portions of the data were generated or stored; and process the converted time series data, using a time series data anomaly model by the anomaly detection service, to detect one or more anomalies in the converted time series data concurrently.

16. The non-transitory computer-readable storage medium of claim 15, wherein the plurality of portions of the data are stored in a data store, and wherein the instructions that, cause the computer system to obtain the plurality of portions of data over the different time windows from the data source according to the data ingestion interval further comprise instructions that, as a result of being executed by the one or more processors, cause the computer system to:

obtain individual portions of the plurality of portions of the data from the data store at different times corresponding to individual time windows of the different time windows according to the data ingestion interval.

17. The non-transitory computer-readable storage medium of claim 15, wherein the instructions that, cause the computer system to obtain the plurality of portions of data over the different time windows from the data source according to the data ingestion interval further comprise instructions that, as a result of being executed by the one or more processors, cause the computer system to:

receive individual portions of the plurality of portions of the data from the data source at different times corresponding to individual time windows of the different time windows according to the data ingestion interval.

18. The non-transitory computer-readable storage medium of claim 15, wherein the instructions further comprise instructions that, as a result of being executed by the one or more processors, cause the computer system to:

process the converted time series data, using a time series data anomaly model by the anomaly detection service, to detect one or more anomalies in the converted time series data upon expiration of a delay time period after corresponding time windows of the plurality of time windows.

* * * * *